United States Patent
Okada et al.

(10) Patent No.: US 6,312,792 B1
(45) Date of Patent: Nov. 6, 2001

(54) ELECTRICALLY CONDUCTIVE MEMBER AND IMAGE-FORMING APPARATUS

(75) Inventors: Tokuo Okada, Kodaira; Koji Takagi, Kawasaki; Hiroshi Kaneda; Toshiaki Arai, both of Kodaira; Takahiro Kawagoe, Tokorozawa, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/328,596

(22) Filed: Jun. 10, 1999

(30) Foreign Application Priority Data

Jun. 10, 1998 (JP) .................................................. 10-162471
Jun. 10, 1998 (JP) .................................................. 10-162472

(51) Int. Cl.[7] .............................. B32B 7/02; B32B 9/04; B32B 27/00
(52) U.S. Cl. ...................... 428/220; 428/332; 428/411.1; 428/422.8; 428/423.1; 428/423.9; 428/424.4; 428/424.7; 428/424.8; 428/425.8; 252/500; 399/115; 399/116; 399/122; 399/176; 399/159; 399/130; 399/279; 399/302; 399/313; 492/48; 492/53

(58) Field of Search ............................ 252/500; 428/220, 428/332, 411.1, 422.8, 423.1, 423.9, 424.4, 424.7, 424.8, 425.8; 399/115, 116, 122, 176, 159, 130, 279, 302, 313; 492/48, 53

(56) References Cited

U.S. PATENT DOCUMENTS 6,004,669 * 12/1999 Rokutan et al. ...................... 428/335

* cited by examiner

*Primary Examiner*—Leszek Kiliman
(74) *Attorney, Agent, or Firm*—Sughrue, Mion, Zinn, Macpeak & Seas, PLLC

(57) ABSTRACT

An electrically conductive member comprising an electrically conductive elastic layer and a coating layer formed thereon, characterized in that said coating layer is formed from a polyurea resin as a cured product resulting from reaction between a polyamine compound and a polyisocyanate compound. It has a coating layer which readily conforms to elastic deformation of rubber or the likes, has long durability, and has good properties in protection of the photosensitive body from staining and prevention of toner sticking, control of the toner charging and a low coefficient of friction.

16 Claims, 4 Drawing Sheets

ELECTRICALLY CONDUCTIVE MEMBER AND IMAGE-FORMING APPARATUS

BACKGROUND OF THE INVENTION

The present invention relates to an electrically conductive member in the form of a belt, a roller, a drum, a blade, etc. which is used in an image-forming apparatus, such as a copying machine, an electrophotographic apparatus including a laser printer, an ink jet printer, a toner let printer, a thermal transfer printer, a thermal sublimation printer, and an impact printer.

A related art image-forming apparatus, such as the coping machine and the printer, are equipped with such members as a belt, a roller, a drum, a blade, etc. for charging, development, transfer, intermediate transfer, toner layer forming, toner conveying, toner stirring, cleaning, fixing, and paper carrying.

These members are usually required to be soft and hence are formed from an electrically conductive rubbery elastic body or cellular body which is optionally mixed with metal or fiber or laminated with resin molding. In addition, these members formed from a rubbery elastic body or cellular body have their surface coated with a resin layer for various objects, such as protecting the photosensitive body from staining, preventing the toner from sticking to the photosensitive body, controlling the toner charging, and adjusting the resistance and frictional characteristics.

Unfortunately, the resin coating layer is by far harder than rubber or the like and hence does not conform easily to the elastic deformation of rubber. As the result, it cracks when formed on a belt or roller and such cracks permit rubber ingredients to ooze out or permit toner particles to stick to them. Besides, the coating layer changes in frictional characteristics due to cracking, and thus, these troubles lead to failure to achieve the desired object in early stages. Particularly, the life of the coating layer is a serious problem in the case of belt-like or drum-like members which need a higher degree of deformability than any other members. A conceivable way to address this problem is to form the coating layer from a polyurethane resin which has a comparatively good flexibility. Although a polyurethane resin easily conforms to the elastic deformation of rubber, it is not satisfactory in its ability to protect the photosensitive body from staining, to prevent the toner sticking, and to reduce the coefficient of friction. Therefore, it does not fully achieve the object of the coating layer.

SUMMARY OF THE INVENTION

The present invention was completed in view of the foregoing. It is an object of the present invention to provide an electrically conductive member to be used for image-forming apparatus such as copying machines and printers, more particularly, to provide the electrically conductive member having features suitable to form a coating layer made of an elastic material such as rubber which fully conforms to the elastic deformation of rubber, has a long life, prevents the toner sticking, controls the toner charging, and controls the coefficient of friction. It is another object of the present invention to provide an image-forming apparatus equipped with the electrically conductive member.

In order to achieve the above-mentioned objects, the present inventors carried out a series of researches, which led to the finding that a polyurea resin as a cured product resulting from reaction between a polyamine compound and a polyisocyanate compound has good characteristic properties required for the coating layer which should protect the photosensitive body from staining, prevent the toner sticking, control the toner charging, adjust the resistance, and control the coefficient of friction, is able to fully conform to the deformation of rubber, and is superior in wear resistance and durability, and hence it is suitable for forming the coating layer of the electrically conductive member to be used for image-forming apparatus. The present invention is based on this finding.

Thus the present invention covers an electrically conductive member comprising an electrically conductive elastic layer and a coating layer formed thereon, characterized in that the coating layer contains a polyurea resin as a cured product resulting from reaction between a polyamine compound and a polyisocyanate compound. The present invention also provides an image-forming apparatus equipped with the electrically conductive member.

DESCRIPTION OF THE INVENTION

The invention will be described in more detail in the following.

The electrically conductive member of the present invention is composed of an electrically conductive elastic layer and a coating layer formed thereon. The electrically conductive elastic layer may be made of any elastic material incorporated with an adequate conducting material. The elastic material is not specifically restricted. It includes, for example, nitrile rubber, ethylene propylene rubber, styrene butadiene rubber, butadiene rubber, isoprene rubber, natural rubber, silicone rubber, urethane rubber, acrylic rubber, chloroprene rubber, butyl rubber, and epichlorohydrin rubber. They may be used alone or in combination with one another. Preferable among these examples are nitrile rubber, urethane rubber, acrylic rubber, and epichlorohydrin rubber, to be used alone or in the form of blend with the other rubber, such as ethylene propylene rubber. The blended material exhibits good adhesion with the polyurea resin forming the coating layer.

The electrically conductive elastic layer has its conductivity normally imparted or regulated by incorporation with a conducting material. The conducting material is divided into an ionic conducting material and an electron conducting material. The ionic conducting material includes, for example, salts of ammonium and salts of alkali metal or alkaline earth metal. The former include perchlorate, chlorate, hydrochloride, bromate, iodate, fluoroborate, sulfate, ethylsulfate, carboxylate, and sulfonate of tetraethyl ammonium, tetrabutyl ammonium, lauryltrimethyl ammonium, stearyltrimethyl ammonium, octadecyltrimethyl ammonium, dodecyltrimethyl ammonium, hexadecyltrimethyl ammonium, benzyltrimethyl ammonium, and modified fatty acid dimethyl ethyl ammonium. The latter include perchlorate, chlorate, hydrochloride, bromate, iodate, fluoroborate, trifluoromethyl sulfate, and sulfonate of alkali metal or alkaline earth metal, such as lithium, sodium, calcium, and magnesium.

The electron conducting material includes, for example, electrically conductive carbon, such as ketjen black and acetylene black; rubber carbon, such as SAF, ISAF, HAF, FEF, GPF, SRF, FT, and MT; acid-treated ink carbon; pyrolyzed carbon; graphite; electrically conductive metal oxide, such as tin oxide, titanium oxide, and zinc oxide; and metals, such as nickel and copper.

The conducting material may be used in any unrestricted amount. The ionic conducting material may be used in an amount of 0.01–5 parts by weight, preferably 0.05–2 parts by weight, for 100 parts by weight of the main component, such as rubber. The electron conducting material may be used in an amount of 1–50 parts by weight, preferably 5–40 parts by weight, for 100 parts by weight of the main component. The resistance value of the conductive elastic layer should be adjusted to $10^3$–$10^{10}$ Ω.cm, preferably $10^4$–$10^8$ Ω.cm.

Incidentally, the conductive elastic layer may be incorporated with any known filler, vulcanizing agent, and other rubber additives, in addition to the above-mentioned conducting material, according to need.

The electrically conductive elastic layer is not specifically restricted in physical properties, such as hardness, permanent compression set, and surface roughness. These physical properties may be properly established according to the intended use, shapes and other conditions belonging to the electrically conductive material. In the case where the electrically conductive member is used as the toner carrier, for example, which comes into direct contact with the development roller or the photosensitive body, it should have a JIS-A hardness 60 or lower, preferably 25–55, a permanent compression set at 20% or lower, preferably 10% or lower, and a surface roughness 15 μmRz or lower, preferably 3–10 μmRz or lower in terms of JIS 10-point average roughness. With a JIS-A hardness higher than 60, the toner carrier becomes so hard that it has a smaller area in contact with the photosensitive body etc., which prevents the formation of good images. Moreover, the toner carrier with a hard surface may damage the toner, causing the toner to stick to the photosensitive body and the layer forming blade, which results in poor images. Conversely, with an excessively low hardness, the electrically conductive elastic layer experiences large friction with the photosensitive body and the layer forming blade, which results in jitter or the like leading to poor images. Besides, with a surface roughness greater than 15 μmRz in terms of JIS 10-point average, it is necessary to form the coating layer thick so that the toner carrier has a smooth surface. A thick coating layer leads to a hard surface of the toner carrier which may damage the toner, causing the damaged toner to stick to the photosensitive body and the layer forming blade, giving rise to poor images. By contrast, if the electrically conductive elastic layer has an excessively small surface roughness, the resulting toner carrier has a coating layer which is too smooth to hold the toner sufficiently. This leads to a decreased image density. From the standpoint of the permanent compression set, the electrically conductive elastic layer should be formed from polyurethane rubber capable to lower the permanent compression set with ease.

The coating layer is formed from a polyurea resin as a cured product resulting from reaction between a polyamine compound and a polyisocyanate compound.

Preferred examples of the polyamine compound include polyether polyol, polyester polyol, polycarbonate polyol, polyolefin polyol, or polymer polyol with its hydroxyl group replaced by an amino group, which are commonly used as a raw material for polyurethane. Conversion of hydroxyl groups into amino groups may be accomplished by reaction of polyol with nitrobenzoic acid chloride and subsequent reduction of nitro groups into amino groups, by introduction of aminobenzoic acid groups through ester interchange reaction, or by reaction of polyol with aminobenzoic acid and subsequent esterifying reaction to introduce aminobenzoic acid groups.

Of these polyamine compounds, a polyether polyamine compound is preferable because it gives rise to a polyurea resin having a low glass transition point. With a high glass transition point, the polyurea resin becomes so brittle at low temperatures that it does not fully conform to the deformation of the elastic layer of rubber or the like. The glass transition point of the polyurea resin should preferably be 0° C. or lower, particularly −20° C. or lower. In addition, a polyether polyamine compound is preferable because it gives rise to a polyurea resin which is stable to hydrolysis and ozone and nitrogen oxide which are evolved in the image-forming apparatus.

The polyisocyanate compound to be reacted with the above-mentioned polyamine compound is a compound having two or more isocyanate groups in the molecule. It is selected from those polyisocyanate compounds used as a raw material for polyurethane. Examples of the polyisocyanate compound include tolylene diisocyanate (TDI), diphenylmethanediisocyanate (MDI), naphthalenediisocyanate (NDI), tolydinediisocyanate (TODI), hexamethylenediisocyanate (HDI), isophoronediisocyanate (IPDI), phenylenediisocyanate, xylylenediisocyanate (XDI), tetramethylxylylenediisocyanate (TMXDI), cyclohexanediioscyante, lysine ester diisocyanate, lysine ester triisocyanate (LDI), undecanetriisocyanate, hexamethylenetriisocyanate, and triphenylmethanetruisocyanate, and their polymers, derivatives, modified products, and hydrogenated products thereof. Of these examples, aliphatic isocyanate (such as hexamethylenediisocyanate) and alicyclic isocyanate (such as isophoronediisocyanate) and their polymers, derivatives, and modified products are desirable because of their good ozone resistance and heat resistance.

Reaction between a polyamine compound and a polyisocyanate compound readily proceeds and hence cures at a low temperature. On the other hand, when mixing those as one-component paint, it may have an unduly short pot-life. In such a case, a polyisocyanate compound modified in block form is desirable for use.

The polyurea resin used in the present invention is a cured product resulting from reaction between the amino group (—$NH_2$) in the polyamine compound and the isocyanate group (—NCO) in the polyisocyanate compound, that reaction forming the urea linkage (—NHCONH—). The polyamine compound and polyisocyanate compound may be mixed in such a ratio that the molar ratio of —NCO groups of polyisocyanate compound to —$NH_2$ groups of polyamine compound (or —NCO/$NH_2$ ratio) is from 0.7 to 1.5, preferably from 0.8 to 1.3.

The electrically conductive member of the present invention has the coating layer which is formed from the polyurea resin in combination with additional components. The polyurea resin functions as a binder and the additional components may be added for the purpose of reducing a coefficient of friction, tackiness, and surface energy, and controlling static charge behavior, static capacity, and resistance. Examples of the additional components include those resins such as urethane resin, fluorocarbon resin, polyamide, polyester, alkyd resin, melamine resin, phenolic resin, epoxy resin, acrylic resin, acrylsilicone resin, acrylurethane resin, silicone resin, amino resin, urea resin, chlorinated polyethylene, ethylene-vinyl acetate resin, ethylene-ethyl acrylate resin, and polyvinyl butyral resin; conducting materials, such as carbon powder, metal powder, metal oxide powder, and ionic substance; slip agents, such as fluorocarbon plastics, silicone, molybdenum sulfide, and graphite in the form of fine particles; and charge-control agents.

Examples of the conducting materials may also include those which were listed above for the electrically conductive elastic layer. In the case where the polyurea resin is incorporated with a conducting material to impart conductivity to the coating layer or to control the conductivity of the coating layer, it is desirable to use an ionic conducting material, although this is not imperative. An ionic conducting material is better in uniformity than a particle dispersed electron conducting material, such as carbon powder and hence the coating layer incorporated with it has uniform resistance, suppressing variations in resistance and permits easy resistance control.

The coating layer may be formed by any process which is not specifically restricted. A desirable process is by coating, such as dipping, roll coating, knife coating, and spraying with a solution or dispersion containing polyamine compounds, polyisocyanate compounds, and additional components. Coating is followed by drying at room temperature or at high temperature around 50–170° C. for reaction and curing. Preferable solvents for the solution or dispersion include ketones, such as acetone, methyl ethyl ketone, and cyclohexanone; aromatic hydrocarbons, such as toluene and xylene; aliphatic hydrocarbons, such as hexane; alicyclic hydrocarbons, such as cyclohexane; esters, such as ethyl acetate; ethers, such as isopropyl ether and tetrahydrofuran; amides, such as dimethylsulfamide; halogenated hydrocarbons, such as chloroform and dichloroethane; and mixtures thereof.

The thickness of the coating layer is not specifically restricted, however, it is usually around 1–200 $\mu$m, preferably 3–100 $\mu$m. In the case where the electrically conductive member is used as the toner carrying roller, such as the development roller, the thickness of the coating layer should preferably be 1–100 $\mu$m, particularly 5–30 $\mu$m. Also, the resistance of the coating layer is not specifically restricted, and it may be properly established according to the usage of the electrically conductive member or the object of the coating layer. If the object is to give and receive charge to and from materials, such as toner and transfer paper and other members, such as a photosensitive body or to apply a potential bias, the resistance of the coating layer is usually set slightly higher than that of the electrically conductive elastic layer. A desirable resistance is about $10^6$–$10^{16}$ $\Omega$.cm, particularly $10^8$–$10^{16}$ $\Omega$.cm.

As mentioned above, according to the present invention, the coating layer is formed from a polyurea resin which is a cured product resulting from reaction between a polyamine compound as a major ingredient and a polyisocyanate compound as a hardening agent. The polyurea resin is incorporated with various additives for which the polyurea resin functions as a binder component.

In this case, although it is not restricted particularly, the coating layer should preferably contain an amount of 30% of soluble matter or less, particularly 10% or less, which can be extracted by a solvent, such as methyl ethyl ketone and toluene, which readily dissolves the polyamine compound as the raw material. The amount of soluble matter is proportional to the amount of components with a comparatively low molecular weight and the amount of components which are not completely cured, both included in the coating layer. Forming the coating layer containing such components on the surface of electrically conductive members brings about contamination of the photosensitive body, aggregation of toner, staining with toner, wearing of the coating layer, and increase in coefficient of friction. Incidentally, the amount of soluble matter can be obtained from the equation below;

Soluble matter $(\%) = (A-B)/A \times 100$ (where A is the weight before solvent extraction, and B is the weight after solvent extraction.)

The electrically conductive member on which the above-mentioned coating layer is formed may have any values of resistance and surface roughness which are adequately established according to its shape and object. If it is used as the toner carrier, such as the development roller, its resistance should preferably be $10^6$–$10^{12}$ $\Omega$.cm, particularly $10^7$–$10^{10}$ $\Omega$.cm, and its surface roughness should preferably be 10 $\mu$mRz or lower, preferably 1–8 $\mu$mRz in terms of JIS 10-point average. An excessively great surface roughness exceeding 10 $\mu$mRz results in toner particles being charged less or oppositely, which leads to fogging. Conversely, with an excessively small surface roughness Rz, the coating layer does not carry toner particles sufficiently, which leads to a low image density.

According to the present invention, the electrically conductive member is composed of the above-mentioned electrically conductive elastic layer and the above-mentioned coating layer formed thereon. The electrically conductive elastic layer may take on any shape, such as a belt, a roller, a drum, and a blade, according to its intended use. The electrically conductive elastic layer may be formed from a laminated material or composite material containing metal, fiber, resin moldings, etc. according to the shape and intended use. For example, if it takes on a drum-like or roller-like shape, it may be formed on a metal or plastic core in the form of a drum, a roller, or a rod. If it takes on a belt-like or blade-like shape, it may have a reinforcing layer laminated thereon or embedded therein, so that the electrically conductive rubber layer is reinforced sufficiently to form into a belt-like or blade-like shape.

The reinforcing layer may be a resin-reinforced layer or a fiber-reinforced layer or both. The resin-reinforced layer may be formed from any known thermoplastic resins, thermoplastic elastomers, and thermosetting resins, such as polycarbonate resin, polyester resin, polyamide resin, polyimide resin, polyurethane resin, polyether resin, polyvinyl resin, polyvinylidene resin, polyether-ether-ketone resin, and polysulfone resin. The above-mentioned resin-reinforced layer may be formed in multiple layers or combined with a fiber layer to be described later. The resin-reinforced layer may be formed by molding from the above-mentioned resin or by lamination from resin previously formed in a film.

The fiber layer may be formed from any known woven cloth or non-woven cloth of natural fiber, such as jute, wool, silk, and cotton; regenerated fiber, such as viscose; synthetic fiber, such as polyester, nylon (6, 66, 46, etc.), vinylon, vinylidene chloride, polyolefin (polyethylene, polypropylene, etc.), and polyclerk; semisynthetic fiber, such as acetate; so-called high-performance fiber, such as aramid fiber, polyvinyl alcohol fiber, and polyacrylonitrile fiber; and metal fiber, such as stainless steel and other steel. The woven cloth may be of plain weave, twill weave, satin weave, or combination thereof. A plain weave fabric is desirable for practical use because of its strength and economy.

The fiber layer may be of multiple layer structure, laminating woven and non-woven clothes. The thickness of the fiber layer should preferably be 0.01–2 mm, more preferably 0.05–0.5 mm, although it is not specifically restricted. With a thickness smaller than 0.01 mm, the fiber layer is poor in dimensional stability and is liable to deformation, such as stretching in a belt-like member. With a thickness greater than 2 mm, the fiber layer stiffens the belt-like member. The fiber for the woven cloth or non-woven cloth constituting the fiber layer is not specifically restricted in fineness. An adequate fineness is 20–420 denier, preferably 30–210 denier, and more desirably 30–80 denier. The woven cloth and non-woven cloth are not specifically restricted in thickness, but the thinner one is preferable. An adequate thickness is 0.01–0.2 mm, preferably 0.05–0.15 mm. With a thickness smaller than 0.01 mm, the woven cloth or non-woven cloth gives rise to the fiber layer which is poor in dimensional stability and liable to deformation, such as stretching in the belt-like member. With a thickness larger than 0.2 mm, the woven cloth or non-woven cloth impairs the flexibility of the member.

The woven cloth or non-woven cloth constituting the fiber layer may be partly or entirely impregnated with rubber or resin if needed, so as to improve the fiber layer in surface smoothness and adhesion to the electrically conductive elastic layer or the coating layer. The preferable impregnant for this purpose includes the same rubber as exemplified for the electrically conductive elastic layer in the form of rubber cement, epoxy resin, resorcinol formaldehyde resin (RFL), and mixtures thereof. Rubber-impregnated or resin-impregnated woven cloth or non-woven cloth can be obtained easily by coating with or dipping in the impregnant.

The electrically conductive member of the present invention is used in a various form of a belt roller, a drum, a blade, etc. It produces its full effect when used in the form of a belt, a drum, or a roller which needs adequate elasticity. It finds use for charging, development, transfer, intermediate transfer, toner layer forming, toner conveying, toner stirring, cleaning, toner fixation, and paper transfer in image-forming machines such as copying machines and printers. It produces its striking effect when it is used as a toner carrier roller, such as a development roller, a belt or a drum for transfer, intermediate transfer and paper conveying.

Figure 1:
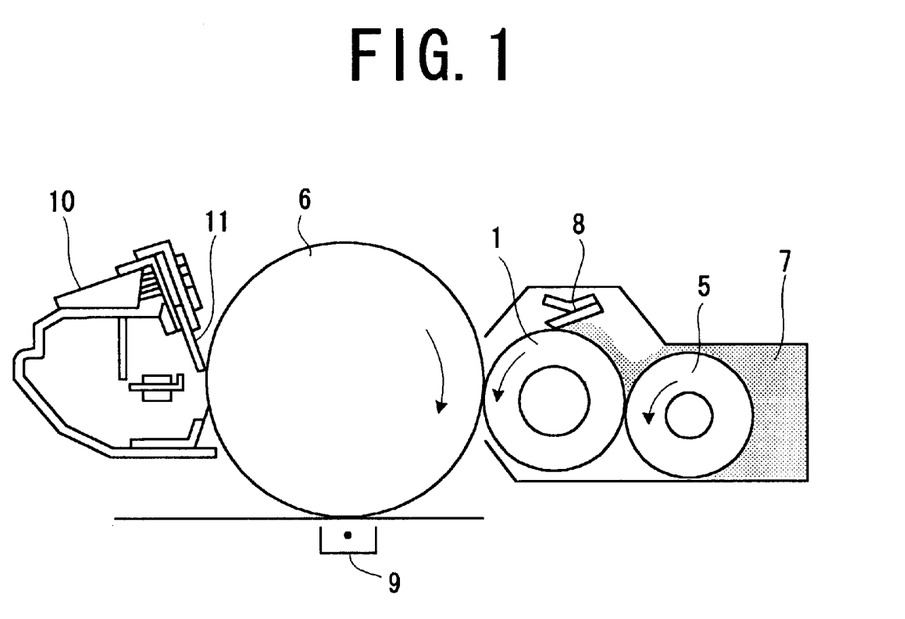
FIG. 1 is a schematic diagram showing one example of the image-forming apparatus (development unit) equipped with the toner carrier which is made of the electrically conductive member pertaining to the present invention.

In the case where the electrically conductive member of the present invention is used to form a toner carrier roller for pressure development in the image-forming apparatus to develop electrostatic latent images, the image-forming apparatus has the structure as shown in FIG. 1. In this apparatus, the toner carrier (development roller) 1 is arranged between a toner coating roller 5 to supply the toner and an image-forming body (photosensitive body) 6 to hold an electrostatic latent image. The toner carrier 1, the image-forming body 6, and the toner coating roller 5 rotate in their respective directions indicated by arrows in the figure. As a result, the toner 7 is supplied to the surface of the toner carrier 1 by the toner coating roller 5. The toner is then made into a uniform thin layer by the layer forming blade 8. In this state, the toner carrier 1 rotates in contact with the image-forming body 6, so that the toner formed in thin layer attaches itself to the latent image on the image-forming body 6. Thus the latent image is made visible. There is shown a transfer unit 9, which transfers a toner image to the recording medium such as paper. There is shown a cleaning unit 10, which has a cleaning blade 11 to scrape off residual toner from the image-forming body 6 after image transfer.

Figure 2:
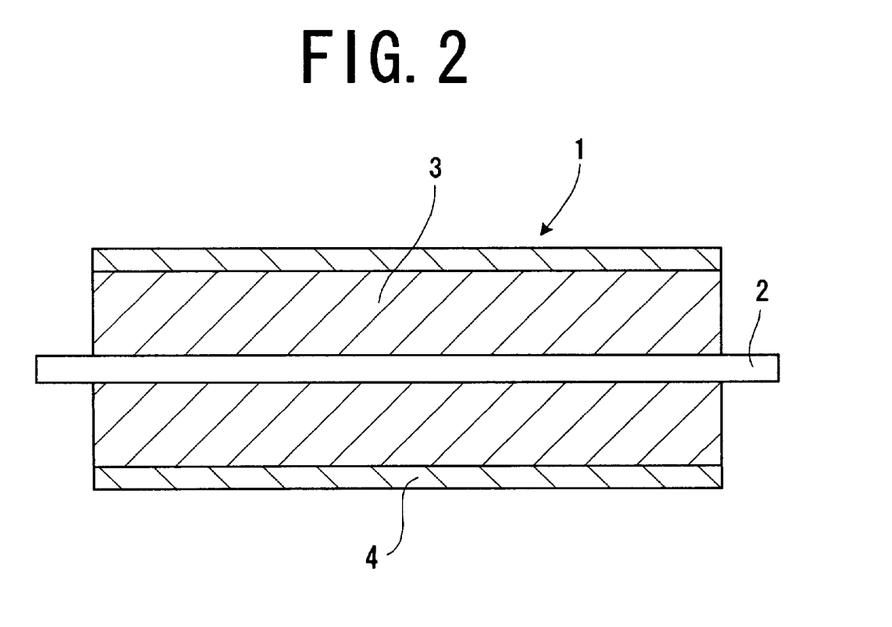
FIG. 2 is a schematic sectional view showing one example of the toner carrier which is made of the electrically conductive member pertaining to the present invention.

The image-forming apparatus of the pressure development system mentioned above requires that the toner carrier 1 should rotate in close contact with the above-mentioned image-forming body 6. To meet this requirement, the toner carrier 1 is made up of a shaft 2, an electrically conductive elastic layer 3, and a coating layer 4, as shown in FIG. 2. The shaft 2 is made of a good conducting material such as metal. The electrically conductive elastic layer 3 having prescribed conductivity and good elasticity is formed on outer periphery of the shaft 2. The coating layer 4 has several functions. That is, it makes the toner 7 to be charged and attracted adequately, it controls friction with the image-forming body 6 and the layer-forming blade 8, and it protects the photosensitive body from staining by the elastic body.

According to the present invention, the toner carrier 1 is composed of the electrically conductive elastic layer 3 and the coating layer 4, which are made of the above-mentioned specific materials. In the toner carrier of the present invention, the coating layer 4 containing the above-mentioned polyurea resin has good resistance to friction with the toner, the toner coating roller, and the layer forming blade. It retains its good surface properties for use over a long period of time and fully functions as the coating film to protect the photosensitive body from staining and toner sticking, to control the charging and resistance of the toner, and to control the coefficient of friction. Because of its good durability, it does not impair images with fogging of white image, harsh half-tone and uneven monochrome density which would otherwise occur when it wears and causes toner filling. Thus, according to the present invention, it is possible to promptly prevent images from deteriorating, thereby producing good images surely over a long period of time.

The image-forming apparatus, in which the electrically conductive member of the present invention is used as the toner carrier, is not restricted to that shown in FIG. 1 so long as it is equipped with a toner carrier which supports a toner on its surface and forms a thin layer of toner thereon, comes into contact with or approaches the image-forming body while carrying the toner for supplying the toner to the surface of the image-forming body, so that a visible image is formed on the surface of the image-forming body. For example, the image-forming apparatus may be the one in which the image-forming body is a sheet of paper or OHP, for example, and the toner held on the toner carrier is allowed to scatter directly to this image-forming body through holes made in a control electrode, so that an image is formed directly on paper or OHP sheet.

Figure 3:
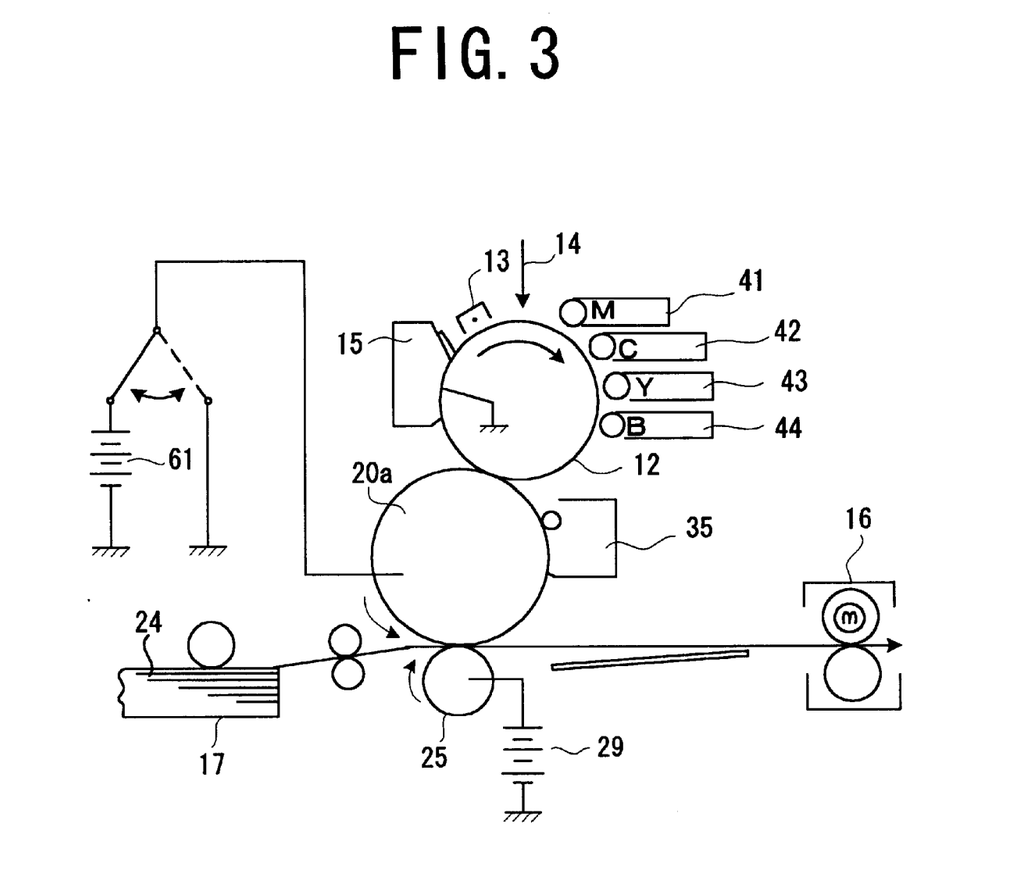
FIG. 3 is a schematic diagram showing a color image-forming apparatus equipped with a drum-like intermediate transfer member.

In order to illustrate how the electrically conductive member of the present invention is preferably used, two kinds of color image-forming apparatus employing intermediate transfer system are explained below. One is shown in FIG. 3, which employs a drum-like intermediate transfer member. The other shown in FIG. 4 employs a belt-like intermediate transfer member.

Figure 4:
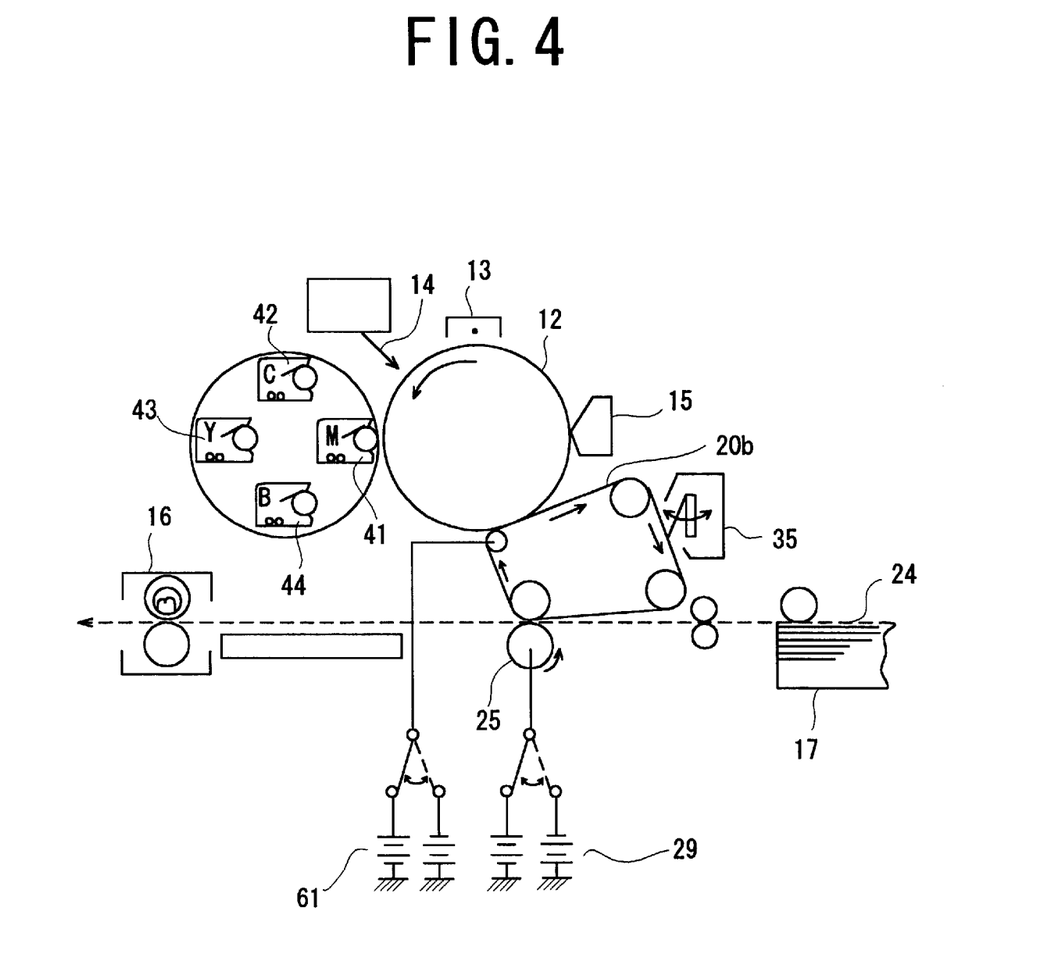
FIG. 4 is a schematic diagram showing a color image-forming apparatus equipped with a belt-like intermediate transfer member.

In FIGS. 3 and 4, there is shown a drum-like photosensitive body 12, which rotates in the direction of arrow indicated in the figures. It is charged with a primary charger 13, and the charge on the exposed portion is partly erased by image exposure 14 such that a static latent image corresponding to the first color component is formed on the photosensitive body 12. The static latent image is developed with a magenta toner M, the first color, by the developer 41, so that a magenta toner image of the first color is formed on the photosensitive body 12. This toner image is transferred to the intermediate transfer drum 20a in FIG. 3 which rotates in contact with the photosensitive body 12 or the intermediate transfer belt 20b in FIG. 4. (The drum and belt are collectively referred to as "intermediate transfer member 20a, 20b" hereinafter.) The transfer from the photosensitive body 12 to the intermediate transfer member 20a, 20b is accomplished at the nip portion between them by the primary bias applied to the intermediate transfer member 20a, 20b from the power source 61. After the magenta toner image of the first color has been transferred to the intermediate transfer member 20a, 20b, the photosensitive body 12 has its surface cleaned by the cleaning unit 15. Thus the development and transfer for the photosensitive body by first round is completed. Whereafter, the photosensitive body rotates further three times to form sequentially a cyan toner image of the second color, a yellow toner image of the third color, and a black toner image of the fourth color on the photosensitive body 12 by the developers 42 to 44 by each rotation. These images are transferred to and overlapped on the intermediate transfer member 20a, 20b each time the photosensitive body rotates. Thus a desired composite color toner image is formed on the intermediate transfer member 20a, 20b. Incidentally, the apparatus shown in FIG. 4 is run such that each time the photosensitive body 12 rotates, the developers 41 to 44 sequentially perform development with magenta toner M, cyan toner C, yellow toner Y, and black toner B, one after another.

The intermediate transfer member 20a, 20b on which the composite color toner image has been formed as mentioned above, gets the transferred roller 25 come into contact with it, so that a recording medium 24, such as paper is fed into the nip portion from the paper feeding cassette 17. At the same time, a secondary transfer bias is applied to the transfer roller 25 from the power source 29, so that the composite color toner image is transferred to the recording medium 24 from the intermediate transfer member 20a, 20b. The recording medium 24 is then introduced into the developer 16, in which the composite color toner image on the recording medium 24 is heated and fixed to be made finally into a desired image. The intermediate transfer member 20a, 20b after the composite color toner image transferred to the recording medium 24, is subsequently cleaned the surface thereon of residual toner by the cleaning unit 35. Thus the initial state is restored and the apparatus is ready for the next run of image forming.

Figure 5:
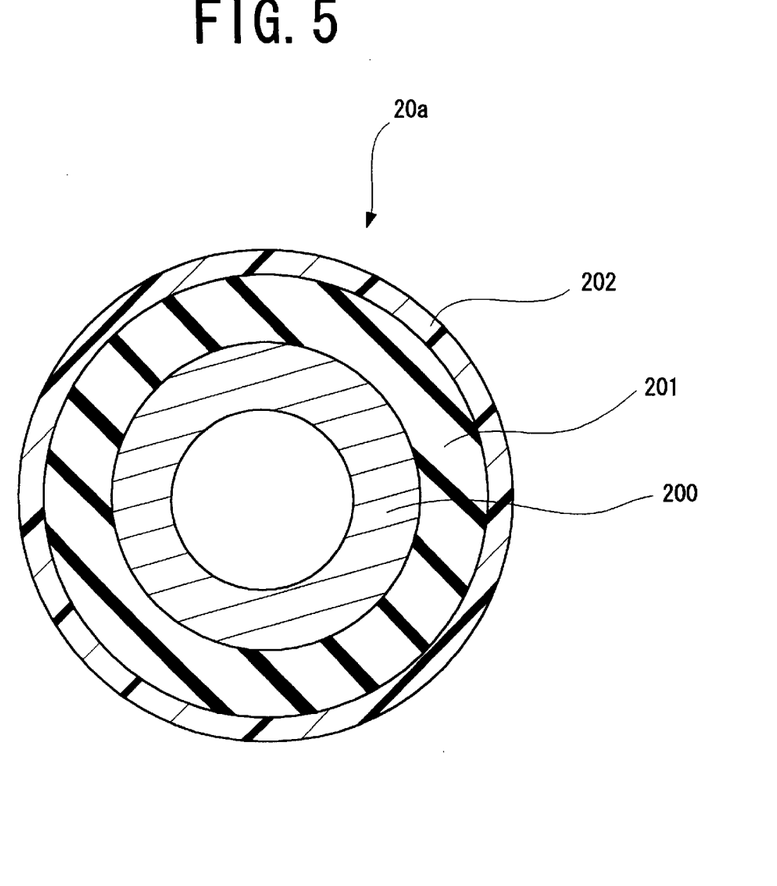
FIG. 5 is a schematic sectional view showing a drum-like intermediate transfer member which is made of the electrically conductive member pertaining to the present invention.
Figure 6:
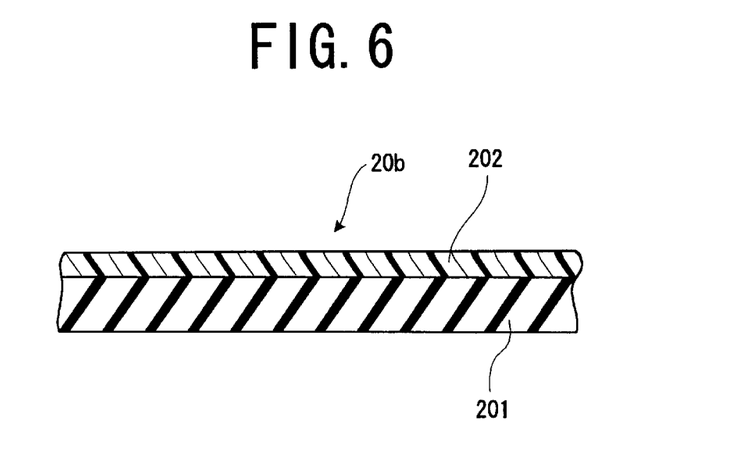
FIG. 6 is a schematic sectional view showing a belt-like intermediate transfer member which is made of the electrically conductive member pertaining to the present invention.

The electrically conductive member of the present invention may be used as the intermediate transfer member 20a, 20b and the transfer roller 25 in the image-forming apparatus of the intermediate transfer system mentioned above. For example, it may be the intermediate transfer member 20a which takes on a drum-like shape as shown in FIG. 3. In this case, it may be composed of a metallic drum base 200, an electrically conductive layer 201 formed thereon, on which a coating layer 202 is further formed as shown in FIG. 5. It may also be the intermediate transfer member 20b which takes on a belt-like shape as shown in FIG. 4. In this case, it may be composed of a belt-like electrically conductive layer 201 reinforced with a woven cloth or spirally wound fiber (not shown), and a coating layer 202 formed thereon, as shown in FIG. 6.

The advantage of using the electrically conductive member of the present invention as the intermediate transfer drum 20a, the intermediate transfer belt 20b, or the transfer roller 25, is that the coating layer forming the surface readily conforms to the elastic deformation of the member without cracking or the like in the coating layer, produces good effects, such as protection of the photosensitive body from staining, prevention of toner sticking, control of toner charging, and control a coefficient of friction. Therefore, it contributes to good image-forming performance, or intermediate transfer performance, and good images over a long period of time.

As mentioned above, the electrically conductive member of the present invention has a coating layer which is made of a polyurea resin as a cured product resulting from reaction between a polyamine compound and a polyisocyanate compound. Therefore, it does not present any shortcomings, such as cracking in the coating layer, and thus the electrically conductive member of the present invention has good long-lasting durability and outstanding performance, such as protection of the photosensitive body from staining, prevention of toner sticking, control of toner charging, resistance and a coefficient of friction.

EXAMPLES

The invention will be described in more detail with reference to the following examples and comparative examples, which are not intended to restrict the scope thereof. In the examples, pbw means "part by weight".

Example 1

A polyol composition was prepared by mixing from 100 pbw of polyether polyol (OH value=33, molecular weight= 5000) obtained by adding propylene oxide and ethylene oxide to glycerin, 1.0 pbw of 1,4-butanediol, 1.5 pbw of silicone surfactant, 0.5 pbw of nickel acetylacetonate, 0.01 pbw of dibutyltin dilaurate, and 2.0 pbw of acetylene black.

After defoaming by stirring under reduced pressure, the polyol composition was stirred for two minutes with 17.5 pbw of urethane-modified MDI. The resulting mixture was cast into a mold preheated at 110° C. in which a metal shaft had been placed. After curing at 110° C. for two hours, there was obtained a roller made up of a metal shaft and an electrically conductive elastic layer formed outer periphery thereon. The surface of the roller was polished so that it has a surface roughness of 7 µmRz in terms of JIS 10-point average roughness. The surface roughness was measured using a surface roughness meter "Surfcom 590A" (of Tokyo Seimitsu) to be used as well in the following examples.

A coating material of the composition as shown in Table 1 was prepared from the following components.

1) "Porea S100" as a polyamine compound, or a polyether polyamine compound, having an amine value of 91 mgKOH/g (of Ihara Chemical Co., Ltd.)

2) "Vestanat T1890" as a polyisocyanate compound, or isocyanurate-modified isophoronediisocyanate, containing 17% NCO (of Huls Japan)

3) MEK (methyl ethyl ketone) as a solvent

The first two components were mixed such that the —NCO/—NH$_2$ ratio was 1.05. The above-mentioned roller was dipped in this coating material, and then taken out followed by heating at 110° C. for six hours. Thus there was obtained a toner carrier in roller form which has a crosslinking cured coating layer on top, as shown in FIG. 2.

Example 2

The same procedure as in Example 1 was repeated to prepare a toner carrier in roller form, except that the coating material was incorporated with 0.142 pbw of sodium perchlorate (NaClO$_4$).

Comparative Example 1

A coating material of the composition as shown in Table 1 was prepared from the following components.

1) "Beckolite M6402", oil-free alkyd resin (50% solids) as a binder resin (of Dainippon Ink and Chemicals)

2) "Superbeckamine L145", melamine resin with 60% solids as a binder resin (of Dainippon Ink and Chemicals)
3) "Printex 35" carbon black as a conducting agent (of Degussa Japan)
4) MEK (methyl ethyl ketone) as a solvent A toner carrier in roller form was prepared in the same manner as in Example 1 except that the coating layer was formed from this coating material.

Comparative Example 2

The same procedure as in Comparative Example 1 was repeated to prepare a toner carrier in roller form, except that the coating layer was formed by drying at 90° C. for six hours.

The toner carrier obtained in each example was tested as follows. The results are shown in Table 1.

Thickness of Coating Layer

The thickness of the coating layer was measured by observing the vertical cross section of the roller by a scanning electron microscope. All the samples measured were found to be about 15 µm thick.

Soluble Matter in the Coating Layer

The coating material used for forming the coating layer of the toner carrier was spread over a glass plate, and the coating film on the glass plate was heated for crosslinking curing under the same condition as used for the toner carrier. The cured coating film, together with the glass plate, was immersed in methyl ethyl ketone at room temperature for 24 hours. After drying, the coating film was weighed. The amount of soluble matter was calculated from the equation below.

Soluble matter=$(A-B)/A \times 100$ (%)

(where A is the weight before solvent extraction, and B is the weight after solvent extraction.)

Glass Transition Point of Coating Layer

The coating material used for forming the coating layer of the toner carrier was spread over a Teflon-treated plate, and the coating film on the plate was heated for crosslinking curing under the same condition as used for the toner carrier. The cured coating film was stripped off from the plate. The unsupported film was examined for the temperature dependency of dynamic viscoelasticity. The glass transition point of the coating layer was obtained from loss tangent (tan δ) to define it as a transition point of the coating layer.

Resistance of Coating Layer

The coating material used for forming the coating layer of the toner carrier was spread over a copper plate, and the coating film formed on the copper plate was heated for crosslinking curing under the same condition as used for the toner carrier. The cured coating film was measured for resistance occurred between the copper plate and the electrode placed on the coating film.

Resistance of the Roller

The toner carrier was pressed against a copper plate with a load of 500 g attached to each end thereof. A voltage of 100V was applied and resistance was measured using a resistance ratio meter R8340A (of Advantest).

Amount of Electric Charge on Toner

Each toner carrier as the development roller was mounted on the development unit as shown in FIG. 1. It was rotated at a circumferential speed of 50 mm/sec, so that a uniform thin layer of toner was formed thereon. The thin layer of toner was sucked into a Faraday gage for measurement of charge amount.

Evaluation of Image

Each toner carrier as the development roller was mounted on the development unit as shown in FIG. 1. It was rotated at a linear speed of 60 mm/sec for reversal development to obtain an image with a non-magnetic one-component toner having an average particle diameter of 7 µm, at a development bias of −400V and blade bias of −600V. The images were examined for quality (white, halftone, and black) before and after continuous 10000 runs.

TABLE 1

| | | Example 1 | Example 2 | Comparative Example 1 | Comparative Example 2 |
|---|---|---|---|---|---|
| Composition of coating material (pbw) | Porea S100 | 100.0 | 100.0 | | |
| | T1890 | 42.1 | 42.1 | | |
| | M6402 | | | 112.0 | 112.0 |
| | L145 | | | 33.3 | 33.3 |
| | Printex 35 | | | 15.2 | 15.2 |
| | NaClO$_4$ | | 0.142 | | |
| | MEK | 213.1 | 213.1 | 108.0 | 108.0 |
| Drying temperature (° C.) | | 110 | 110 | 110 | 90 |
| Coating layer | Soluble matter (%) | 1 | 2 | 18 | 22 |
| | Resistance (Ω · cm) | $1.3 \times 10^{12}$ | $8.4 \times 10^{10}$ | $7.9 \times 10^{13}$ | $1.3 \times 10^{14}$ |
| | Glass transition point (° C.) | −25 | −25 | 35 | 10 |
| Resistance of roller (Ω) | | $1.1 \times 10^8$ | $6.3 \times 10^7$ | $2.0 \times 10^8$ | $2.5 \times 10^8$ |
| Amount of charge on toner (µC/g) | | 29 | 28 | 26 | 25 |
| Initial image quality | White image | good | good | good | good |
| | Halftone image | good | good | good | good |
| | Black image | good | good | good | good |
| Image quality after 10000 runs | White image | good | good | fogging | fogging |
| | Halftone image | good | good | harshness | good |
| | Black image | good | good | density variation | good |
| Appearance of roller after 10000 runs | | good | good | cracks and scratches in coating layer | toner filming |

It is noted from Table 1 that the toner carrier of the electrically conductive member of the present invention gives good images, free of fogging in white image, harshness in halftone image, and density variation in black image, even after continuous 10000 runs. This demonstrates the assured good durability of the toner carrier of the present invention for use over a long period of time.

Examples 3 to 6

A woven cloth was wound round a mandrel. On the woven cloth, a rubber compound composed of nitrile rubber and ethylene propylene rubber with carbon necessary for adequate resistance was laminated. Upon vulcanization, there was obtained a rubber belt having 240 mm of width, 450 mm of length, and 1 mm of thickness. The rubber had a hardness of 40° (JIS-A hardness) and a volume intrinsic resistivity of $1.0 \times 10^6$ Ω.cm.

A coating material of the composition as shown in Table 2 was prepared from the following components.

1) "Porea S100" as a polyamine compound or a polyether polyamine compound, having an amine value of 91 mgKOH/g (from Ihara Chemical Co., Ltd.)

2) "Porea R100" as a polyamine compound or a polyether polyamine compound, having an amine value of 128 mgKOH/g (from Ihara Chemical Co., Ltd.)
3) "Mitec NY220A" as a polyisocyanate compound or trimethylolpropane-modified isophoronediisocyanate, containing 75% solids and 8.4% NCO (from Mitsubishi Chemicals)
4) "Vestanat T1890" as a polyisocyanate compound or isocyanurate-modified isophoronediisocyanate, containing 17% NCO (from Huls Japan)
5) MEK (methyl ethyl ketone) as a solvent
6) PTFE powder (polytetrafluoroethylene powder having a median diameter of 0.3 μm) as a slip agent The first two components were mixed such that the —NCO/—NH$_2$ ratio was 1.05. The coating material was applied by spraying to the above-mentioned rubber belt so that a coating layer of about 30 μm thickness was formed thereon. Upon drying and curing at 110° C. for 6 hours, there was obtained an intermediate transfer belt.

Comparative Example 3

The same procedure as in Examples 3 to 6 was repeated to form the intermediate transfer belt, except that the coating layer was formed from the coating material in which the polyurea resin was replaced by polyurethane having composition as shown in Table 2 using the followings;

1) "Nippollan 3126" as a 53% solution of polyester-based urethane polyol (of Nippon Polyurethane Co., Ltd.)
2) TDI (tolylene diisocyanate)
3) PTFE powder
4) TL (toluene)
5) MEK The intermediate transfer belt obtained in each example was tested as follows. The results are shown in Table 2.

Soluble Matter in the Coating Layer

The coating material used for forming the coating layer of the belt was spread over a glass plate, and the coating film on the glass plate was heated for crosslinking curing under the same condition as used for the belt. The cured coating film, together with the glass plate, was immersed in methyl ethyl ketone at room temperature for 24 hours. Before and after drying, the coating film was weighed. The amount of soluble matter in the coating layer of the belt was calculated from the equation below.

$$\text{Soluble matter} = (A-B)/A \times 100\ (\%)$$

(where A is the weight before solvent extraction, and B is the weight after solvent extraction.)

Resistance of Coating Layer

The coating material used for forming the coating layer of the belt was spread over a copper plate, and the coating film on the copper plate was heated for crosslinking curing under the same condition as used for the belt. The cured coating film was measured for resistance between the copper plate and the electrode placed on the coating film.

Test for Staining of the Photosensitive Body

The belt was kept pressed to the photosensitive drum under a load of 500 g attached to each end thereof for three weeks. After separating the belt from the photosensitive body, the photosensitive drum was examined for surface staining.

Test for Toner Sticking

The belt was sprinkled with the toner and then wiped off with a piece of cotton paper. The belt was examined for residual toner.

Coefficient of Friction

The belt was tested for the coefficient of maximum static friction against a polyester film under a load of 200 g by using a Heydon surface property tester (SHINTO Scientific Co., Ltd.).

Test for Belt Flexion

A specimen measuring 20 mm of width and 350 mm of length was cut out of the belt. The specimen was hung on a pulley (16 mm in diameter) and moved up and down in both directions at a speed of 30 rpm, under a tension of 1 kg/mm (which is produced by attaching an adequate weight to each end of the specimen). After 30000 runs, the belt surface was observed.

TABLE 2

| | | Example 3 | Example 4 | Example 5 | Example 6 | Comparative Example 3 |
|---|---|---|---|---|---|---|
| Composition of coating material (pbw) | Porea S100 | 100 | 100 | | | |
| | Porea R100 | | | 100 | 100 | |
| | Nippollan 3126 | | | | | 200 |
| | NY220A | 85 | | 120 | | |
| | T1890 | | 42 | | 59 | |
| | TDI | | | | | 2.7 |
| | PTFE powder | 115 | 99 | 133 | 111 | 76 |
| | MEK | 230 | 220 | 260 | 240 | 170 |
| | TL | | | | | 153 |
| Properties of coating layer | Soluble matter (%) in coating layer | 2.4 | 0.6 | 1.2 | 0.2 | 6.4 |
| | Resistance of coating layer (Ω · cm) | $6.3 \times 10^{12}$ | $7.2 \times 10^{12}$ | $5.9 \times 10^{12}$ | $7.5 \times 10^{12}$ | $1.0 \times 10^{14}$ |
| | Resistance of belt (Ω · cm) | $1.8 \times 10^{11}$ | $2.1 \times 10^{11}$ | $1.7 \times 10^{11}$ | $2.2 \times 10^{11}$ | $2.9 \times 10^{12}$ |
| Performance test | Staining of photosensitive body | Not stained | Not stained | Not stained | Not stained | Slightly stained |

TABLE 2-continued

|  | Example 3 | Example 4 | Example 5 | Example 6 | Comparative Example 3 |
|---|---|---|---|---|---|
| Toner sticking | No sticking | No sticking | No sticking | No sticking | Sticking |
| Coefficient of friction | 0.6 | 0.5 | 0.3 | 0.2 | 1.3 |
| Belt flexion | No cracking after 30000 flexion | No cracking after 30000 flexion | No cracking after 30000 flexion | No cracking after 30000 flexion | No cracking after 30000 flexion |

It is noted from Table 2 that the electrically conductive member of the present invention used as the intermediate transfer member has a coating layer which shows good properties in protection of the photosensitive body from staining and prevention of toner sticking, friction characteristics, and excellent flexural resistance.

What is claimed is:

1. An electrically conductive member comprising an electrically conductive elastic layer and a coating layer formed thereon, characterized in that said coating layer contains a polyurea resin as a cured product resulting from reaction between a polyamine compound and a polyisocyanate compound.

2. An electrically conductive member as defined in claim 1, wherein said polyamine compound is a polyether polyamine compound.

3. An electrically conductive member as defined in claim 1, wherein said polyisocyanate compound is at least one compound selected from the group consisting of an aliphatic polyisocyanate compound, an alicyclic polyisocyanate compound, and a hydrogenated aromatic polyisocyanate compound.

4. An electrically conductive member as defined in claim 3, wherein said polyisocyanate compound is at least one compound selected from the group consisting of hexamethylenediisocyanate, isophoronediisocyanate and derivatives thereof.

5. An electrically conductive member as defined in claim 1, wherein said electrically conductive elastic layer has a resistance of $10^3$–$10^{10}$ Ω.cm.

6. An electrically conductive member as defined in claim 1, wherein said coating layer is electrically conductive and has a resistance of $10^6$–$10^{16}$ Ω.cm.

7. An electrically conductive member as defined in claim 6, wherein said coating layer has its resistance adjusted with an ionic conducting material.

8. An electrically conductive member as defined in claim 1, wherein the coating layer contains 30% or less of soluble matter, wherein said soluble matter is measured by:

Soluble matter $(\%) = (A-B)/A \times 100$ wherein A is the weight of the coating layer as measured before a solvent extraction with methyl ethyl ketone solvent and B is the weight of the coating layer as measured after solvent extraction.

9. An electrically conductive member as defined in claim 1, wherein said coating layer has a thickness of 1–100 μm.

10. An electrically conductive member as defined in claim 1, which is a toner carrier carrying a toner in such a way as to form a thin layer of said toner on a surface thereof, and when said toner carrier touches or approaches an image-forming body with said toner carried thereon, the toner carrier supplies said toner to the surface of said image-forming body, thereby forming a visible image on the surface of said image-forming body.

11. An electrically conductive member as defined in claim 1, which is an intermediate transfer member arranged between an image-forming body for holding a toner image formed on a surface thereof and a recording medium, and which receives the toner image from the image-forming body and transfers it to the recording medium.

12. An electrically conductive member as defined in claim 1, which is a charging member in contact with an object to be charged and conducts a voltage therebetween for charging the object.

13. An electrically conductive member as defined in claim 1, which is a transfer member that provides a contact between a recording medium and an image-carrying body carrying a toner image to transfer the toner image to the recording medium when a voltage is applied across the image-carrying body and the electrically conductive member.

14. An electrically conductive member as defined in claim 13, wherein said image-carrying body is an image-forming body holding a toner image formed on a surface thereof.

15. An electrically conductive member as defined in claim 13, wherein said image-carrying body is an intermediate body carrying a toner image on its surface.

16. An image-forming apparatus equipped with said electrically conductive member defined in claim 10.

* * * * *